(12) United States Patent
Yamamoto et al.

(10) Patent No.: US 11,965,058 B2
(45) Date of Patent: Apr. 23, 2024

(54) OXYMETHYLENE-COPOLYMER MANUFACTURING METHOD

(71) Applicant: MITSUBISHI GAS CHEMICAL COMPANY, INC., Tokyo (JP)

(72) Inventors: Yuuta Yamamoto, Mie (JP); Daisuke Sunaga, Mie (JP); Takuya Okada, Mie (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 360 days.

(21) Appl. No.: 16/645,051

(22) PCT Filed: Jun. 12, 2018

(86) PCT No.: PCT/JP2018/022442
§ 371 (c)(1),
(2) Date: Mar. 6, 2020

(87) PCT Pub. No.: WO2019/053976
PCT Pub. Date: Mar. 21, 2019

(65) Prior Publication Data
US 2020/0362085 A1   Nov. 19, 2020

(30) Foreign Application Priority Data
Sep. 12, 2017 (JP) .............................. JP2017-175138

(51) Int. Cl.
*C08G 2/18* (2006.01)
*C08K 5/32* (2006.01)

(52) U.S. Cl.
CPC . *C08G 2/18* (2013.01); *C08K 5/32* (2013.01)

(58) Field of Classification Search
CPC ..................................... C08G 2/18; C08K 5/32
See application file for complete search history.

(56) References Cited

U.S. PATENT DOCUMENTS

| | | | |
|---|---|---|---|
| 9,745,400 B2 * | 8/2017 | Nakao | C08G 2/06 |
| 10,975,189 B2 * | 4/2021 | Yamamoto | C08L 59/04 |
| 2014/0323621 A1 | 10/2014 | Niuchi et al. | |
| 2015/0112018 A1 | 4/2015 | Nakaya et al. | |
| 2015/0299427 A1 | 10/2015 | Hsieh et al. | |
| 2016/0168324 A1 | 6/2016 | Okui et al. | |
| 2018/0118885 A1 | 5/2018 | Okui et al. | |

FOREIGN PATENT DOCUMENTS

| | | |
|---|---|---|
| EP | 3 109 267 A1 | 12/2016 |
| EP | 3 431 520 | 1/2019 |
| JP | 39-6390 | 5/1964 |
| JP | 58-34819 | 3/1983 |
| JP | 2-35772 | 8/1990 |
| JP | 8-208784 | 8/1996 |
| JP | 11-35791 | 2/1999 |
| JP | 2000-290334 | 10/2000 |
| JP | 2010-70222 | 4/2010 |
| WO | 2013/094393 | 6/2013 |
| WO | 2013/172270 | 11/2013 |
| WO | 2015/005169 | 1/2015 |
| WO | 2017/159602 | 9/2017 |

OTHER PUBLICATIONS

Official Communication dated Aug. 28, 2018 in International Patent Application No. PCT/JP2018/022442.
Extended European Search Report issued in European Patent Application No. 18856972.7 dated Sep. 16, 2020.

* cited by examiner

*Primary Examiner* — Vickey Nerangis
(74) *Attorney, Agent, or Firm* — GREENBLUM & BERNSTEIN, P.L.C.

(57) ABSTRACT

An oxymethylene-copolymer manufacturing method includes: polymerizing a polymerization raw material containing trioxane and a comonomer in the presence of an acid catalyst in a quantity that is $1.0 \times 10^{-8}$ moles to $5.0 \times 10^{-6}$ moles with respect to 1 mole of trioxane; adding a hydroxylamine compound represented by general formula (1) (in the formula, $R^1$ and $R^2$ are, independently of each other, a hydrogen atom or an organic group having 1-20 carbon atoms) to a reaction product obtained during the polymerizing of the polymerization raw material at 50-5000 times the quantity of the acid catalyst, in terms of the molar quantity, and mixing the hydroxylamine compound with the reaction product; and subjecting the mixture of the reaction product and the hydroxylamine compound, which is obtained during the adding of the hydroxylamine compound, to an additional melt-kneading.

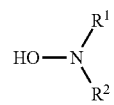

(1)

7 Claims, No Drawings

OXYMETHYLENE-COPOLYMER MANUFACTURING METHOD

TECHNICAL FIELD

The present invention relates to a method for manufacturing an oxymethylene copolymer.

BACKGROUND ART

Oxymethylene copolymers are widely used in variety of industrial fields due to their excellent mechanical, chemical, physical and electrical properties. Generally, an oxymethylene copolymer is produced by polymerizing trioxane with a comonomer such as alkylene oxide or cyclic formal in the presence of an acidic polymerization catalyst (acid catalyst). In order to suppress depolymerization reaction of the crude oxymethylene copolymer resulting from the polymerization reaction, a deactivator is usually added to deactivate the acid catalyst.

Various methods have conventionally been proposed for deactivating acid catalysts. For example, one method is proposed for deactivating an acid catalyst by making contact with an aqueous solution or an organic solvent solution containing a basic neutralizer such as triethylamine, tributylamine or calcium hydroxide (see, for example, Patent document 1). This method, however, uses a large amount of a deactivator solution as much as or more than the weight of the crude oxymethylene copolymer, and thus requires a step of separating the deactivator solution from the crude oxymethylene copolymer and a step of collecting the solvent, rendering the catalyst deactivating step very complicated. Thus, it is hardly an industrially beneficial method.

Alternatively, there are methods in which a small amount of a deactivator is added to a crude oxymethylene copolymer. For example, a method in which an organic solvent solution of a tertiary phosphine compound is used as a deactivator, and a method in which an organic solvent solution of a specific hindered amine compound is used have been proposed (see, for example, Patent documents 2 and 3). However, even if an oxymethylene copolymer is obtained by adding a deactivator for deactivating the acid catalyst, it has poor heat stability by itself and is known to be easily degradable due to main chain scission from the ends of the copolymer via depolymerization reaction or thermal degradation reaction. Moreover, formaldehyde resulting from the depolymerization reaction or the thermal degradation reaction is further oxidized to generate formic acid, which is known to accelerate the degradation reaction of the oxymethylene copolymer. Accordingly, for the purpose of suppressing the aforementioned depolymerization reaction and thermal degradation reaction, an antioxidant such as a sterically hindered phenol or hydroxylamine and a thermal stabilizer such as an amine-substituted triazine compound or a hindered amine are usually added to and melt-kneaded with the oxymethylene copolymer, which is commercially available as an oxymethylene copolymer composition (polyacetal resin composition) (see, for example, Patent documents 4 and 5).

PRIOR ART DOCUMENTS

Patent Documents

Patent document 1: Japanese Examined Patent Application Publication No. Heisei 2-035772

Patent document 2: Japanese Unexamined Patent Application Publication No. 2000-290334

Patent document 3: Japanese Unexamined Patent Application Publication No. Heisei 8-208784

Patent document 4: International Patent Application Publication WO2013/094393

Patent document 5: Japanese Unexamined Patent Application Publication No. 2010-70222

SUMMARY OF INVENTION

Problem to be Solved by the Invention

Even for oxymethylene copolymers obtained by the above-described methods, there remains a problem of formaldehyde generation from the products, especially generation of odor due to the increase in the amount of formaldehyde generated from the products when stored in a high-temperature and high-humidity environment for a long period of time. Therefore, further improvement is required by the market.

Thus, the objective of the present invention is to provide a method for manufacturing an oxymethylene copolymer with which an amount of formaldehyde generated from the product thereof, especially an amount of formaldehyde generated from the product thereof when stored in a high-temperature and high-humidity environment for a long period of time, is reduced and thus generation of odor is suppressed.

Means for Solving the Problem

The present inventors have gone through intensive investigation to solve the above-described problem, and as a result of which found that an oxymethylene copolymer with which the amount of formaldehyde generated from the product thereof, especially the amount of formaldehyde generated from the product thereof when stored in a high-temperature and high-humidity environment for a long period of time, is reduced and thus generation of odor is suppressed can be achieved by adding, mixing and further melt-kneading a specific hydroxylamine compound with a product obtained by polymerizing a polymerization raw material containing trioxane and a comonomer in the presence of a specific amount of an acid catalyst, where the specific hydroxylamine compound is in an amount of 50-5000 molar times the amount of the acid catalyst, thereby accomplishing the present invention.

Thus, the present invention is characterized by the followings.

[1] A method for manufacturing an oxymethylene copolymer, comprising:

a step 1 of polymerizing a polymerization raw material containing trioxane and a comonomer in the presence of $1.0 \times 10^{-8}$ moles or more and $5.0 \times 10^{-6}$ moles or less of an acid catalyst per 1 mole of trioxane;

a step 2 of adding and mixing a hydroxylamine compound represented by General formula (1) below:

where $R^1$ and $R^2$ each independently represent a hydrogen atom or a C1-C20 organic group, with the product obtained in the step 1, wherein the hydroxylamine compound is in an amount of 50-5000 molar times the amount of the acid catalyst; and a step 3 of further melt-kneading the mixture of the product and the hydroxylamine compound obtained in the step 2.

[2] The method according to [1], wherein the hydroxylamine compound is a hydroxylamine compound wherein $R^1$ and $R^2$ each independently represent a hydrogen atom, a linear or branched C1-C20 alkyl group, a C6-C20 aryl group or a C7-C20 arylalkyl group.

[3] The method according to [1] or [2], wherein the hydroxylamine compound is N,N-diethyl hydroxylamine.

[4] The method according to any one of [1]-[3], wherein the hydroxylamine compound is added in an amount of 50-2000 molar times the amount of the acid catalyst in the step 2.

[5] The method according to any one of [1]-[4], wherein the acid catalyst is at least one or more selected from the group consisting of a perchloric acid-based catalyst, a trifluoromethanesulfonic acid-based catalyst and a heteropoly acid-based catalyst.

[6] The method according to any one of [1]-[5], wherein the acid catalyst is perchloric acid or a derivative thereof.

[7] The method according to any one of [1]-[6], wherein the comonomer is at least one selected from the group consisting of ethylene oxide, propylene oxide, butylene oxide, styrene oxide, methyl glycidyl ether, ethyl glycidyl ether, butyl glycidyl ether, phenyl glycidyl ether, 1,3-dioxolane, propylene glycol formal, diethylene glycol formal, triethylene glycol formal, 1,4-butanediol formal, 1,5-pentanediol formal and 1,6-hexanediol formal.

[8] The method according to any one of [1]-[7], wherein the oxymethylene copolymer comprises an oxymethylene group and an oxyalkylene group having two or more carbons, and the content of the oxyalkylene group having two or more carbons contained in the oxymethylene copolymer is 0.4 moles or more and 15 moles or less with respect to a total of 100 moles of the oxymethylene group and the oxyalkylene group.

Effect of the Invention

A method for manufacturing an oxymethylene copolymer of the present invention can provide an oxymethylene copolymer with which an amount of formaldehyde generated from the product thereof, especially an amount of formaldehyde generated from the product thereof when stored in a high-temperature and high-humidity environment for a long period of time, is reduced and thus generation of odor is suppressed.

MODES FOR CARRYING OUT THE INVENTION

Hereinafter, the present invention will be described in detail. The method for manufacturing an oxymethylene copolymer according to the present invention comprises: a step 1 of polymerizing a polymerization raw material containing trioxane and a comonomer in the presence of a specific amount of an acid catalyst; a step 2 of adding and mixing a hydroxylamine compound represented by General formula (1) described later with the product obtained in a step 1, wherein the hydroxylamine compound is in an amount of 50-5000 molar times the amount of the acid catalyst; and a step 3 of further melt-kneading the mixture of the product and the hydroxylamine compound obtained in the step 2. Manufacturing of an oxymethylene copolymer in this manner will give an oxymethylene copolymer with which an amount of formaldehyde generated from the product thereof, especially an amount of formaldehyde generated from the product thereof when stored in a high-temperature and high-humidity environment for a long period of time, is reduced and thus generation of odor is suppressed. Furthermore, in a preferable aspect of the present invention, an oxymethylene copolymer can be obtained which, in addition to reduction of the amount of formaldehyde generated from the product thereof, further has at least one of the effects including excellent heat stability, amelioration of deterioration due to long-term storage and a smaller amount of mold deposits. Reasons for these effects will be described hereinafter but the reasons are not limited thereto.

In the step 2 of the method for manufacturing an oxymethylene copolymer of the present invention, a hydroxylamine compound represented by General formula (1) which will be described later is added and mixed with the product obtained in the step 1, wherein the hydroxylamine compound is in an amount of 50-5000 molar times the amount of the acid catalyst so that the hydroxylamine compound is considered to act as a deactivator for the acid catalyst used in the step 1 and simultaneously as an antioxidant for the product obtained in the step 1. Seemingly as a result of this, depolymerization of the product produced in the step 1 is suppressed, and generation of formic acid due to oxidization of formaldehyde originating from the unreacted raw material and formaldehyde originating from the hemiformal terminal groups and thus degradation reaction caused by formic acid are suppressed. Moreover, in the step 3, the mixture of the product and the hydroxylamine compound obtained in the step 2 is further melt-kneaded so that the acid catalyst used in the step 1 is further deactivated and at the same time the effect as the antioxidant is enhanced. Seemingly as a result of this, depolymerization of the product produced in the step 1 is further suppressed, and generation of formic acid due to oxidization of formaldehyde originating from the unreacted raw material and formaldehyde originating from the hemiformal terminal groups and thus degradation reaction caused by formic acid are further suppressed.

Accordingly, since the hydroxylamine compound represented by General formula (1) which will be described later is considered to act as a deactivator for the acid catalyst used in the step 1 and simultaneously as an antioxidant in both of the adding/mixing step and the melt-kneading step, an oxymethylene copolymer with which the amount of formaldehyde generated from the product thereof is small can be obtained. Furthermore, in addition to a deactivator and an antioxidant, the hydroxylamine compound also acts as a formaldehyde scavenger. Therefore, for example, an oxymethylene copolymer can effectively be obtained, with which the amount of formaldehyde generated from the product thereof, especially an amount of formaldehyde generated when stored in a high-temperature and high-humidity environment for a long period of time, is reduced. Moreover, if the hydroxylamine compound is used, the hydroxylamine compound itself is unlikely to be precipitated as MD (mold deposits) upon molding and therefore an oxymethylene copolymer that causes less mold contamination upon molding can be obtained.

<<Oxymethylene Copolymer>>

First, an oxymethylene copolymer that can be obtained according to a method for manufacturing an oxymethylene copolymer of the present invention will be described. The oxymethylene copolymer of the present invention is a copolymer that can be obtained by carrying out the steps 1-3 described above, usually a polymer compound containing an oxymethylene group (—OCH$_2$—) and an oxyalkylene group with two or more carbons as the constituent units. Examples of the oxyalkylene group with two or more carbons include, but not particularly limited to, an oxyethylene (—OCH$_2$CH$_2$—) group, an oxypropylene (—OCH(CH$_3$)CH$_2$—) group and an oxybutylene (—OCH$_2$CH$_2$CH$_2$CH$_2$—) group. Among them, an oxyethylene group (—OCH$_2$CH$_2$—) is particularly preferable as the oxyalkylene group with two or more carbons.

While the content of the oxyalkylene group with two or more carbons contained in the oxymethylene copolymer is not particularly limited, it is preferably 0.4 moles or more and 15 moles or less, more preferably 0.4 moles or more and 10 moles or less, and particularly preferably 0.4 moles or more and 5.0 moles or less with respect to a total of 100 moles of the oxymethylene group and the oxyalkylene group.

The oxymethylene copolymer obtained by the manufacturing method of the present invention contains a hydroxylamine compound represented by General formula (1) which will be described later. Furthermore, as will be described later, in some cases, it may contain any component added to an extent that does not interfere with the purpose of the present invention. In this case, the resulting oxymethylene copolymer is an oxymethylene copolymer composition, and thus an "oxymethylene copolymer" of the present invention also comprises an oxymethylene copolymer composition.

The content of the hydroxylamine compound contained in the oxymethylene copolymer is preferably 5 mass ppm or more and 2000 mass ppm or less, more preferably 5 mass ppm or more and 500 mass ppm or less, and particularly preferably 5 mass ppm or more and less than 100 mass ppm. The content of the hydroxylamine compound as mentioned herein refers to the total content (amount in terms of hydroxylamine compound) of a free hydroxylamine compound, a hydroxylamine compound forming a salt with the acid catalyst and a product resulting from reaction between formaldehyde and the hydroxylamine compound contained in the oxymethylene copolymer. While the method for determining the content of the hydroxylamine compound is not particularly limited, it may be determined, for example, with a total nitrogen analyzer (TN analyzer).

The oxymethylene copolymer obtained according to the manufacturing method of the present invention is characterized by a smaller amount of formaldehyde generated from the product thereof, specifically, the amount of formaldehyde generated from the product thereof when stored in a high-temperature and high-humidity environment for a long period of time. The amount of formaldehyde generated from the product can be evaluated, for example, by determining the amount of formaldehyde generated upon heat treating a sample that has been dried with hot air at 80° C. for 3 hours by headspace gas chromatography, which can be used for evaluating the amount of formaldehyde generated right after the manufacturing of the oxymethylene copolymer. Meanwhile, the amount of formaldehyde generated when stored in a high-temperature and high-humidity environment for a long period of time can be evaluated, for example, by determining the amount of formaldehyde generated upon heat treating a sample that has been subjected to humidification under the conditions of a temperature of 80° C. and a relative humidity of 98% for 24 hours by headspace gas chromatography, which can be used for evaluating the amount of formaldehyde generated from the humidified oxymethylene copolymer. The amount of formaldehyde generated from the oxymethylene copolymer right after the manufacturing and after the humidification as determined by the method described in the example herein is 130 mass ppm or less, preferably 120 mass ppm or less and more preferably 115 mass ppm or less right after the manufacturing, and 170 mass ppm or less, more preferably 160 mass ppm or less and still more preferably 150 mass ppm or less after the humidification.

The oxymethylene copolymer obtained by a manufacturing method of a preferable aspect of the present invention is characterized by excellent heat stability. Specifically, according to a manufacturing method of a preferable aspect of the present invention, the acid catalyst can be deactivated effectively with the predetermined hydroxylamine compound, by which degradation of the polymer main chain due to the acid catalyst that was not deactivated can be suppressed, thereby obtaining an oxymethylene copolymer having a larger molecular weight and excellent heat stability. Since the molecular weight of the oxymethylene copolymer is correlated with the melt index (MI) value, it can be evaluated by determining the MI value.

The oxymethylene copolymer obtained according to a manufacturing method of a preferable aspect of the present invention is characterized in resulting a small amount of MD upon molding. The amount of MD can be evaluated, for example, by magnifying and observing the mold after 4000 shots of continuous molding using an injection molding machine.

<<Method for Manufacturing Oxymethylene Copolymer>>

Next, a method for manufacturing an oxymethylene copolymer of the present invention will be described in detail.

(Step 1)

A method for manufacturing an oxymethylene copolymer of the present invention comprises a step 1 of polymerizing a polymerization raw material containing trioxane and a comonomer in the presence of a specific amount of an acid catalyst.

<Trioxane>

Trioxane (also referred to as "1,3,5-trioxane") is a cyclic trimer of formaldehyde. Trioxane that can be used for manufacturing the oxymethylene copolymer of the present invention is not particularly limited as long as it is a cyclic trimer of formaldehyde, and it may be a commercially available product or a product produced by a conventionally known production method. Moreover, the method for producing trioxane is also not particularly limited. In addition, trioxane may contain an amine as a stabilizer as long as it does not significantly inhibit the polymerization reaction. The content of the amine as the stabilizer is usually 0.00001-0.003 millimoles, preferably 0.00001-0.0005 millimoles and particularly preferably 0.00001-0.0003 millimoles per 1 mole of trioxane.

Examples of the amine added as the stabilizer include, but not particularly limited to, amine compounds having an alcoholic hydroxyl group in the molecule such as a primary amine, a secondary amine, a tertiary amine and triethanolamine. Here, an alcoholic hydroxyl group refers to a hydroxyl group directly bound to a carbon atom other than an aromatic hydrocarbon and a carbonyl group. In particular, triethanolamine is preferable.

Although trioxane may contain water, formic acid, methanol and formaldehyde which are impurities that are inevitably generated upon industrially manufacturing trioxane, trioxane containing such impurities can also be used. In such a case, the total amount of water, formic acid, methanol and formaldehyde in trioxane is preferably 500 mass ppm or less, more preferably 450 mass ppm or less and particularly preferably 400 mass ppm or less in trioxane. In particular, the content of water is preferably 200 mass ppm or less, more preferably 100 mass ppm or less and particularly preferably 50 mass ppm or less.

<Comonomer>

While a comonomer is not particularly limited as long as it is capable of introducing an oxyalkylene group with two or more carbons as a constituent unit into the oxymethylene copolymer, examples include a cyclic ether, a glycidyl ether compound and a cyclic formal. In particular, it is preferably one or more selected from C2-C10 comonomers, for example, cyclic ethers such as ethylene oxide, propylene oxide, butylene oxide, styrene oxide and 1,3-dioxolane; glycidyl ether compounds such as methyl glycidyl ether, ethyl glycidyl ether, butyl glycidyl ether and phenyl glycidyl ether; and cyclic formals such as propylene glycol formal, diethylene glycol formal, triethylene glycol formal, 1,4-butanediol formal, 1,5-pentanediol formal and 1,6-hexanediol formal. Among them, ethylene oxide, 1,3-dioxolane, diethylene glycol formal and 1,4-butanediol formal are preferable, and 1,3-dioxolane is particularly preferable. One or more types of these comonomers may be used alone or in combination. The comonomer is used to form an oxyalkylene group with two or more carbons in the oxymethylene copolymer.

The content of the comonomer in the polymerization raw material is usually 1-50 parts by mass, preferably 1-30 parts by mass and particularly preferably 1-13 parts by mass with respect to 100 parts by mass of trioxane.

<Acid Catalyst>

While the acid catalyst is not particularly limited, it may be, for example, a superstrong acid catalyst that can be used for manufacturing an oxymethylene copolymer. Examples of such a superstrong acid catalyst include perchloric acid-based catalysts, trifluoromethanesulfonic acid-based catalysts and heteropoly acid-based catalysts, for example, trifluoromethanesulfonic acid, $HF-SbF_5$, $HF-BF_3$, TFA (trifluoroacetic acid), phosphotungstic acid, phosphomolybdic acid, silicotungstic acid, perchloric acid and derivatives thereof, where phosphotungstic acid, perchloric acid or a derivative thereof is preferable. Examples of perchloric acid derivatives include, but not limited to, perchloric anhydride and acetyl perchlorate. One or more types of these acid catalysts may be used alone or in combination.

The amount of the acid catalyst, especially perchloric acid, used is $1.0\times10^{-8}$ moles or more and $5.0\times10^{-6}$ moles or less, preferably $3.0\times10^{-8}$ moles or more and $2.0\times10^{-6}$ moles or less and particularly preferably $5.0\times10^{-8}$ moles or more and $1.0\times10^{-6}$ moles or less per 1 mole of trioxane used. By setting the amount of the acid catalyst used to be smaller than the upper limit value of the above-mentioned range, the amounts of the hemiacetal terminal group ($-O-CH_2-OH$) susceptible to thermal degradation, the formic acid ester terminal group ($-O-CH=O$) susceptible to hydrolysis and the like will be smaller in the resulting oxymethylene copolymer. Accordingly, deactivation of the acid catalyst will be easier and thus depolymerization reaction is less likely to occur upon heating. On the other hand, by setting the amount of the acid catalyst used to be more than the lower limit value of the above-mentioned range, trioxane loss due to insufficient progress of the polymerization reaction can be reduced and the energy needed for separation of the unreacted trioxane from the product (oxymethylene copolymer) and collection of the unreacted trioxane can be reduced, which are economically beneficial.

<Polymerization Reaction>

The process of the polymerization reaction in the step 1 is not particularly limited, and may be conducted by the same process as a conventionally known method for manufacturing an oxymethylene copolymer. Specifically, while any of bulk polymerization, suspension polymerization, solution polymerization or melt polymerization may be employed, bulk polymerization is particularly preferable.

The polymerization device used for the polymerization reaction is not particularly limited. For example, for bulk polymerization, a reaction tank with a stirrer that is generally used for manufacturing an oxymethylene copolymer can be used for a batch case, and a continuous polymerization device for trioxane or the like that has been proposed so far such as a cokneader, a twin-screw continuous extruder/mixer, or a twin-screw paddle-type continuous mixer can be used for a continuous case. Alternatively, multiple polymerizers can be employed in combination.

The temperature upon the polymerization reaction is not particularly limited and is usually 60-120° C. The pressure upon the polymerization reaction is not particularly limited but it is preferably in a range of 99.0-101.00 kPa as an absolute pressure with a given atmospheric pressure of 100 kPa. The time of the polymerization reaction (retention time in the polymerization device) is not particularly limited and is usually 2-30 minutes.

Furthermore, in order to adjust the molecular weight of the oxymethylene copolymer obtained by the polymerization reaction in the step 1, a molecular weight modifier may be added. While the type of the molecular weight modifier is not particularly limited, examples thereof include methylal, methoxymethylal, dimethoxymethylal, trimethoxymethylal and oxymethylene di-n-butyl ether. Among them, methylal is preferable. The amount of the molecular weight modifier added is adjusted within a range of 0 mass % or more and 0.1 mass % or less with respect to the total mass of trioxane and the comonomer in the polymerization raw material, according to the molecular weight of the oxymethylene copolymer of interest.

Moreover, while the method for feeding or adding trioxane, the comonomer, the acid catalyst and the molecular weight modifier used in the step 1 to the polymerization device is not particularly limited, it is favorable to employ a method in which a part or a whole amount of them are sufficiently mixed in advance while keeping them in a liquid state and feeding the resulting polymerization raw material mixture to the polymerization device to conduct the polymerization reaction, so that the amount of the catalyst required for the polymerization reaction and thus the amount of formaldehyde generated from the oxymethylene copolymer can be reduced.

Furthermore, the acid catalyst is preferably diluted in an organic solvent in the step 1 so as to homogeneously disperse the acid catalyst in the reaction system. While the organic solvent is not particularly limited as long as it does not significantly inhibit the polymerization reaction, examples thereof include ethers such as ethylene glycol dimethyl ether, diethylene glycol dimethyl ether and n-butyl ether; aromatic hydrocarbons such as benzene and toluene; aliphatic hydrocarbons such as n-hexane and cyclohexane; and halogenated hydrocarbons such as dichloromethane and 1,2-dichloroethane.

While the yield of the product obtained in the step 1 (reaction rate upon polymerization reaction) is not particularly limited, it is preferably 92% or more, more preferably 95% or more and particularly preferably 97% or more. Preferably, the amount of the acid catalyst, the time of the polymerization reaction and the like are controlled to achieve this yield. By making the product yield to be 92% or more, consumption of the energy for collecting the unreacted raw material can be reduced.

(Step 2)

The method for manufacturing an oxymethylene copolymer of the present invention comprises a step 2 of adding and mixing a hydroxylamine compound represented by General formula (1) below:

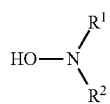

(1)

where $R^1$ and $R^2$ each independently represent a hydrogen atom or a C1-C20 organic group,
 with the product obtained in the step 1.

<Termination of Polymerization Reaction>

The product obtained in the step 1 is still undergoing the polymerization reaction, and the polymerization reaction can be terminated by adding the hydroxylamine compound represented by General formula (1) above to the product. Specifically, the hydroxylamine compound represented by General formula (1) above has a role as a deactivator for the acid catalyst used in the step 1. In particular, since it can effectively deactivate the acid catalyst even if a superstrong acid catalyst is used as the acid catalyst, it can suppress degradation of the polymer main chain due to the acid catalyst that was not deactivated. Moreover, in addition to the function as a deactivator for the acid catalyst as described above, it is also considered to serve as an antioxidant for the product obtained in the step 1. Therefore, presumably, depolymerization of the product produced in the step 1 can be suppressed, and generation of formic acid due to oxidization of formaldehyde originating from the unreacted raw material or formaldehyde originating from the hemiformal terminal groups and thus degradation reaction caused by formic acid can be suppressed. Accordingly, an oxymethylene copolymer can be obtained with which the amount of formaldehyde generated from the product thereof, especially, the amount of formaldehyde generated from the product thereof when stored in a high-temperature and high-humidity environment for a long period of time, is reduced with less occurrence of mold deposits upon molding.

The deactivator for terminating the polymerization reaction may be a known compound such as triphenylphosphine, diethylamine, triethylamine, tributylamine, triethanolamine or N-methyldiethanolamine. Although these compounds are sufficient as a deactivator, they are unsatisfactory in terms of improvement of the heat resistance and heat/moisture resistance, suppression of MD generation, and else. Moreover, when a basic compound that is known as an antioxidant, for example, a hindered amine such as bis(2,2,6,6-tetramethyl-4-piperidyl)sebacate (from BASF, registered trademark, Tinuvin 770) or a mixture of bis(1,2,2,6,6-pentamethyl-4-piperidyl)sebacate and methyl 1,2,2,6,6-pentamethyl-4-piperidyl sebacate (from BASF, registered trademark, Tinuvin 765) is used, these hindered amines will function as a deactivator but they are poor in the effect of suppressing generation of formaldehyde from the product, especially in the effect of suppressing the increase in the amount of formaldehyde generated from the product when stored in a high-temperature and high-humidity environment for a long period of time, and in the effect of suppressing generation of mold deposits upon molding. On the other hand, only when the hydroxylamine compound represented by General formula (1) above is used, the amount of formaldehyde generated from the product, especially the amount of formaldehyde generated from the product when stored in a high-temperature and high-humidity environment for a long period of time can be reduced and generation of the mold deposits upon molding can be reduced, while the hydroxylamine compound also functions as a deactivator.

<Hydroxylamine Compound>

The hydroxylamine compound is not particularly limited as long as it is a compound represented by General formula (1) above. In General formula (1), $R^1$ and $R^2$ each independently represent a hydrogen atom or a C1-C20 organic group.

Herein, a C1-C20 organic group is, for example, a linear or branched C1-C20 alkyl group, a C6-C20 aryl group or a C7-C20 arylalkyl group, where these groups may be substituted with at least one substituent selected from a hydroxyl group, a carboxyl group, a C1-C19 alkoxy group, a C2-C19 alkoxycarbonyl group, a C3-C19 alkoxycarbonyl alkoxy group and a C2-C19 carboxyalkoxy group. Accordingly, preferably, $R^1$ and $R^2$ each independently represent a hydrogen atom, a linear or branched C1-C20 alkyl group, a C6-C20 aryl group or a C7-C20 arylalkyl group. More preferably, $R^1$ and $R^2$ each independently represent a hydrogen atom, a linear or branched C1-C20 alkyl group or a C7-C20 arylalkyl group (provided that not both of $R^1$ and $R^2$ are hydrogen atoms).

Among them, a hydroxylamine compound represented by General formula (1) above where $R^1$ and $R^2$ each independently represent a hydrogen atom, a methyl group, an ethyl group, a propyl group, an isopropyl group, a butyl group, a hexadecyl group, an octadecyl group or a benzyl group (provided that not both of $R^1$ and $R^2$ are hydrogen atoms), is still more preferable, and a hydroxylamine compound represented by General formula (1) above where $R^1$ and $R^2$ are both ethyl groups, octadecyl groups or benzyl groups is particularly preferable. One or more types of these hydroxylamine compounds may be used alone or in combination.

Specifically, as such a hydroxylamine compound, N,N-diethyl hydroxylamine, N-isopropyl hydroxylamine, N,N-bis-octadecyl hydroxylamine or N,N-dibenzyl hydroxylamine is preferable, and N,N-diethyl hydroxylamine, N,N-bis-octadecyl hydroxylamine or N,N-dibenzyl hydroxylamine is more preferable, where N,N-diethyl hydroxylamine is particularly preferable since it is readily available and is excellent in reducing the amount of formaldehyde generated from the product, especially the amount of formaldehyde generated from the product when stored in a high-temperature and high-humidity environment for a long period of time and in reducing generation of mold deposits upon molding.

Furthermore, while hydroxylamine compounds are commercially available in forms of solid, powder and solutions such as aqueous solutions and organic solvents, any of the forms can be used. In particular, it is preferable to use the compound in a form of a solution, i.e., an organic solvent.

The hydroxylamine compound is added and mixed with the product obtained in the step 1. At this point, the hydroxylamine compound may be added as it is (in a solid or solution state) or may be diluted in an organic solvent before being added. If the hydroxylamine compound is to be diluted in an organic solvent, the organic solvent is not particularly limited as long as it does not significantly inhibit the effect of the present invention. For example, aromatic hydrocarbons such as benzene, toluene and xylene; aliphatic hydrocarbons such as such as n-hexane, n-heptane and cyclohexane; C1-C3 alcohols such as methanol and ethanol; halogenated hydrocarbons such as chloroform, dichloromethane and 1,2-dichloroethane; and ketones such as acetone and methyl ethyl ketone can be used.

The amount of the hydroxylamine compound added is preferably 50-5000 molar times the amount of the acid catalyst, specifically perchloric acid, used in the step 1. If the amount is 50 molar times or more, deactivation of the acid catalyst can effectively be suppressed and the amount of formaldehyde generated from the product can be suppressed. While favorable effects can be achieved as long as the amount of the hydroxylamine compound added is in a range of 50-5000 molar times the amount of the acid catalyst, the amount is preferably 2000 molar times or less, more preferably 1000 molar times or less and particularly preferably 600 molar times or less since the smaller the amount is, the more economical it becomes.

<Mixing>

The device and timing for adding and mixing the hydroxylamine compound are not particularly limited. For example, a mixer having similar specification to the above-described polymerizer and directly connected to the above-described polymerizer can be used so that the hydroxylamine compound is added from the inlet of the mixer to be mixed. The temperature upon adding and mixing the hydroxylamine compound is not particularly limited, and it is preferably 0-160° C. and particularly preferably 0-120° C. Moreover, the pressure is not particularly limited, but it is preferably in a range of 99.0-101.0 kPa as an absolute pressure with a given atmospheric pressure of 100 kPa. The time of mixing after the addition (retention time in the mixer) is not particularly limited and is preferably 1-150 minutes and particularly preferably 1-120 minutes.

(Step 3)

The method for manufacturing an oxymethylene copolymer of the present invention comprises a step 3 of further melt-kneading the mixture of the product and the hydroxylamine compound obtained in the step 2. By melt-kneading the mixture of the product and the hydroxylamine compound represented by General formula (1) above obtained in the step 2, deactivation of the acid catalyst used in the step 1 progresses and the acid catalyst is further deactivated. At the same time, melt-kneading of the product and the hydroxylamine compound is also considered to enhance the function of the hydroxylamine compound as an antioxidant. Specifically, the mixture of the product and the hydroxylamine compound is melt-kneaded so that depolymerization of the product produced in the step 1 is further suppressed, and generation of formic acid due to oxidization of formaldehyde originating from the unreacted raw material and formaldehyde originating from the hemiformal terminal group (—O—CH$_2$—OH) and thus degradation reaction caused by formic acid can be further suppressed. Accordingly, heat stability of the resulting oxymethylene copolymer is considered to be enhanced. As a result, an oxymethylene copolymer can be obtained with which the amount of formaldehyde generated from the product thereof, especially, the amount of formaldehyde generated from the product thereof when stored in a high-temperature and high-humidity environment for a long period of time, is reduced and generation of mold deposits upon molding is reduced.

<Melt-Kneading>

The device used for melt-kneading is not particularly limited as long as it can melt and knead the product obtained in the step 1. For example, the mixer for mixing the product and hydroxylamine compound and directly connected to the above-described polymerizer can used for melt-kneading.

The device used for melt-kneading preferably has a ventilation function, where examples of such a device include a single- or multi-screw continuous extrusion kneader having at least one vent hole, and a twin-screw surface renewing type horizontal kneader. One or more of these devices may be used alone or in combination.

The temperature upon melt-kneading is not particularly limited as long as it is higher than the melting point of the product obtained in the step 1, and is preferably in a temperature range of 170° C. or higher and 270° C. or lower, and more preferably 190° C. or higher and 250° C. or lower. If the temperature upon melt-kneading is 270° C. or lower, degradation/deterioration of the product and the melt-kneaded oxymethylene copolymer is unlikely to occur during melt-kneading.

While the pressure upon melt-kneading is not particularly limited, a degassing treatment is preferably conducted under a reduced pressure as well in order to remove trioxane of the unreacted raw material, formaldehyde component originating from trioxane, formaldehyde originating from the hemiformal terminal and the like. Degassing under a reduced pressure can be performed through the above-described vent hole. Accordingly, the pressure upon melt-kneading is preferably in a range of 10-100 kPa, more preferably in a range of 10-70 kPa and particularly preferably in a range of 10-50 kPa as an absolute pressure with a given atmospheric pressure of 100 kPa.

The time of conducting melt-kneading (retention time in the melt-kneader) is not particularly limited, and it is preferably 1-60 minutes and particularly preferably 1-40 minutes.

(Optional Components)

<Other Antioxidant and Thermal Stabilizer>

According to the method for manufacturing an oxymethylene copolymer of the present invention, an antioxidant other than the hydroxylamine compound represented by General formula (1) above (herein, referred to as "other antioxidant") and/or a thermal stabilizer may further be added as long as the purpose of the present invention is not impaired. They may be added in either or both of the steps 2 and 3. Specifically, they may be added simultaneously with the hydroxylamine compound represented by General formula (1) above in the step 2, or they may be added in the step 3. One or more types of other antioxidant and thermal stabilizer may be added.

According to the method for manufacturing an oxymethylene copolymer of the present invention, other antioxidant is preferably added to be used in combination with the hydroxylamine compound represented by General formula (1) above. Although it may be added in either the step 2 or 3 or may be added at multiple timings, it is favorable to add other antioxidant in the step 3. This is because combinational use of other antioxidant can suppress deterioration caused by oxidization.

Examples of other antioxidant include, but not particularly limited to, hindered phenol compounds. Examples of the hindered phenol compound include, but not particularly limited to, 2,2'-methylene-bis(4-methyl-6-t-butylphenol), 4,4'-methylene-bis(2,6-di-t-butylphenol), 1,3,5-trimethyl-2,4,6-tris(3,5-di-t-butyl-4-hydroxybenzyl)benzene, 3,5-di-t-butyl-4-hydroxybenzyl dimethylamine, distearyl-3,5-di-t-butyl-4-hydroxybenzyl phosphonate, diethyl-3,5-di-t-butyl-4-hydroxybenzyl phosphonate, 2,6,7-trioxa-1-phosphabicyclo[2.2.2]oct-4-yl-methyl-3,5-di-t-butyl-4-hydroxy hydrocinnamate, 3,5-di-t-butyl-4-hydroxyphenyl-3,5-distearyl-thiotriazylamine, 2-(2-hydroxy-3,5-di-t-butylphenyl)-5-chlorobenzotriazole, 2,6-di-t-butyl-4-hydroxymethylphenol, 2,4-bis-(n-octylthio)-6-(4-hydroxy-3,5-di-t-butylanilino)-1,3,5-triazine, N,N'-hexamethylenebis(3,5-di-t-butyl-4-hydroxy-hydrocinnamide), octadecyl-3-(3,5-di-t-butyl-4-hydroxyphenyl)propionate, 1,6-hexanediol-bis[3-(3,5-di-t-butyl-4-hydroxyphenyl)propionate], pentaerythritol-tetrakis[3-(3,5-di-t-butyl-4-hydroxyphenyl) propionate], triethylene glycol-bis[3-(3,5-dimethyl-4-hydroxyphenyl)propionate], triethylene glycol-bis[3-(3-t-butyl-5-methyl-4-hydroxyphenyl)propionate], triethylene glycol-bis[3-(3,5-di-t-butyl-4-hydroxyphenyl)propionate] and 2,2'-thiodiethyl-bis[3-(3,5-di-t-butyl-4-hydroxyphenyl) propionate]. Among them, 1,3,5-trimethyl-2,4,6-tris(3,5-di-t-butyl-4-hydroxybenzyl)benzene, pentaerythritol-tetrakis [3-(3,5-di-t-butyl-4-hydroxyphenyl)propionate] and triethylene glycol-bis[3-(3-t-butyl-5-methyl-4-hydroxyphenyl)propionate] are particularly preferable. One or more types of these hindered phenol compounds may be used alone or in combination.

While the amount of other antioxidant added is not particularly limited, it is preferably 0.01-3.0 parts by mass, more preferably 0.05-2.0 parts by mass and still more preferably 0.1-1.0 parts by mass with respect to 100 parts by mass of the oxymethylene copolymer.

According to the method for manufacturing an oxymethylene copolymer of the present invention, a thermal stabilizer is preferably added to be used in combination with the hydroxylamine compound represented by General formula (1) above. Although it may be added in either the step 2 or 3 or may be added at multiple timings, it is favorable to add the thermal stabilizer in the step 3. This is because combinational use of the thermal stabilizer can further suppress generation of formaldehyde from the oxymethylene copolymer.

Examples of the thermal stabilizer include, but not particularly limited to, amino-substituted triazine compounds, and one or more types of metal-containing compounds selected from the group consisting of hydroxides, inorganic acid salts, alkoxides and minerals (for example, hydrotalcite) of alkali metals or alkaline earth metals. One or more types of these thermal stabilizers may be used alone or in combination.

While the total amount of the thermal stabilizer added is not particularly limited, it is preferably 0.01-3.0 parts by mass, more preferably 0.025-2.0 parts by mass and particularly preferably 0.05-1.0 parts by mass with respect to 100 parts by mass of the oxymethylene copolymer.

Examples of the amino-substituted triazine compound include, but not particularly limited to, guanamine, melamine, N-butylmelamine, N-phenylmelamine, N,N-diphenylmelamine, N,N-diallylmelamine, N,N',N''-triphenylmelamine, N,N',N''-trimethylolmelamine, benzoguanamine, 2,4-diamino-6-methyl-sym-triazine, 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, ammeline (2,4-diamino-6-hydroxy-sym-triazine), N,N,N', N'-tetracyanoethyl benzoguanamine and initial polycondensates of them with formaldehyde (for example, an aqueous melamine-formaldehyde resin). Among them, melamine, methylolmelamine, benzoguanamine and an aqueous melamine-formaldehyde resin are particularly preferable. One or more of these amino-substituted triazine compounds can be used alone or in combination.

The one or more types of metal-containing compounds selected from the group consisting of hydroxides, inorganic acid salts, alkoxides and minerals (for example, hydrotalcite) of alkali metals or alkaline earth metals are not particularly limited. Examples of the hydroxide of an alkali metal or an alkaline earth metal include sodium hydroxide, potassium hydroxide, calcium hydroxide and magnesium hydroxide. Examples of the inorganic acid salt include carbonate, phosphate, silicate and borate. Examples of the alkoxide include methoxide and ethoxide. As the mineral, hydrotalcite represented by General formula (2) below may be used.

[Chemical formula 3]

$$[M^{2+}_{1-x}M^{3+}_{x}(OH)_2]^{x+}[A^{n-}_{x/n} \cdot mH_2O]^{-} \quad (2)$$

In Formula (2), $M^{2+}$ represents, but not particularly limited to, a divalent metal ion $Mg^{2+}$, $Mn^{2+}$, $Fe^{2+}$ or $Co^{2+}$. $M^{3+}$ represents, but not particularly limited to, a trivalent metal ion $Al^{3+}$, $Fe^{3+}$ or $Cr^{3+}$. $A^{n-}$ represents, for example, but not particularly limited to, a n-valent (in particular, monovalent or divalent) anion $CO_3^{2-}$, $OH^-$, $HPO_4^{2-}$ or $SO_4^{2-}$. x is $0<x<0.5$ while m is $0 \leq m <1$.

Examples of the method for adding the above-described other antioxidant and/or thermal stabilizer include, but not particularly limited to, a method in which they are fed into the mixer together with the hydroxylamine compound represented by General formula (1) above in the step 2, a method in which a mixture of the product and the hydroxylamine compound obtained in the step 2 is mixed with the above-described other antioxidant and/or thermal stabilizer with a mixer or a tumbler-type blender immediately before melt-kneading in the step 3, and a method in which the above-described other antioxidant and/or thermal stabilizer is fed into the melt-kneader in the step 3.

<Optionally Added Components>

According to the method for manufacturing an oxymethylene copolymer of the present invention, a known additive and/or filler may further be added in addition to the above-described other antioxidant and/or thermal stabilizer as long as the purpose of the present invention is not impaired. Examples of the additive include a mold release agent, an antistatic agent, a weathering stabilizer, a fluorescent brightening agent and a nucleating agent.

Addition of a mold release agent can enhance the mold releasability of the oxymethylene copolymer. While such a mold release agent is not particularly limited, it is preferably polyalkylene glycol, polyethylene, silicone oil, fatty acid, fatty acid ester, a fatty acid metal salt or a higher fatty acid amide having a long chain with 10 or more carbons. One or more types of them may be used alone or in combination.

While the amount of the mold release agent added is not particularly limited as long as the purpose of the present invention is not impaired, it is preferably 0.01-3.0 parts by mass, more preferably 0.05-2.5 parts by mass and particularly preferably 0.05-2.0 parts by mass with respect to 100 parts by mass of the oxymethylene copolymer.

Addition of a nucleating agent can enhance moldability and shorten the molding cycle. While the nucleating agent is not particularly limited, it is preferably boron nitride, hydrated magnesium silicate or a three-dimensionally cross-linked polyacetal.

While the amount of the nucleating agent added is not particularly limited as long as the purpose of the present invention is not impaired, it is preferably 0.001-3.0 parts by mass, more preferably 0.002-2.5 parts by mass and particularly preferably 0.003-2.0 parts by mass with respect to 100 parts by mass of the oxymethylene copolymer.

Addition of the fluorescent brightening agent can enhance whiteness of the oxymethylene copolymer. Examples of the fluorescent brightening agent include, but not particularly limited to, a coumarin-based fluorescent brightening agent and a benzoxazole-based fluorescent brightening agent. Such a fluorescent brightening agent is preferably 3-(4'-acetylaminophenyl)-7-acetylamino coumarin, 3-(4'-carboxyphenyl)-4-methyl-7-diethylamino coumarin or 2,5-bis (5'-t-butylbenzoxazole-2'-yl)thiophene.

While the amount of the fluorescent brightening agent added is not particularly limited as long as the purpose of the present invention is not impaired, it is preferably 0.1-20 mass ppm, more preferably 0.5-10 mass ppm and particularly preferably 1.0-5.0 mass ppm in the oxymethylene copolymer.

While the weathering stabilizer is not particularly limited, a light stabilizer or an ultraviolet absorber is favorably used. As the light stabilizer, a hindered amine-based light stabilizer can favorably be used. Specific examples of the hindered amine-based light stabilizer include bis(1,2,2,6,6-pentamethyl-4-piperidinyl)sebacate, 1-[2-{3-(3,5-di-t-butyl-4-hydroxyphenyl)propionyloxy}ethyl]-4-[3-(3,5-di-t-butyl-4-hydroxyphenyl)propionyloxy]-2,2,6,6-tetramethylpiperidine, tetrakis(1,2,2,6,6-pentamethyl-4-piperidyl)-1,2,3,4-butane tetracarboxylate, 1,2,2,6,6-pentamethyl-4-piperidyl and tridecyl-1,2,3,4-butane tetracarboxylate (a mixture of compounds in which the four ester moieties of butane tetracarboxylate are partially a 1,2,2,6,6-pentamethyl-4-piperidyl group while the rest is a tridecyl group), a condensate of 1,2,3,4-butane tetracarboxylic acid and 1,2,2,6,6-pentamethyl-4-piperidinol and β,β,β,β-tetramethyl-3,9(2,4,8,10-tetraoxaspiro[5.5]undecane)-diethanol, a condensate of dimethyl succinate and 4-hydroxy-2,2,6,6-tetramethyl-1-piperidine ethanol, 1,2,2,6,6-pentamethyl-4-piperidyl methacrylate, N,N',N'',N'''-tetrakis-(4,6-bis-(butyl-(N-methyl-2,2,6,6-tetramethylpiperidine-4-yl)amino)-triazine-2-yl)-4,7-diazadecane-1,10-diamine and bis(1,2,2,6,6-pentamethyl-4-piperidyl)[[3,5-bis(1,1-dimethylethyl)-4-hydroxyphenyl]methyl]butyl malonate. One or more types of the above-mentioned weathering stabilizers may be used alone or in combination.

While the amount of the weathering stabilizer added is not particularly limited, it is preferably 0.01-3.0 parts by mass, more preferably 0.03-2.0 parts by mass and particularly preferably 0.05-1.0 parts by mass with respect to 100 parts by mass of the oxymethylene copolymer.

The above-described optionally added components may be added in either the step 2 or 3 or after the step 3, or may be added at multiple timings as long as the purpose of the present invention is not impaired. If the optionally added components are to be added after the step 3, they are added to the oxymethylene copolymer resulting from the step 3 and the resultant is further melt-kneaded with a single- or multi-screw extruder or the like.

<Usage of Oxymethylene Copolymer>

The oxymethylene copolymer obtained by the manufacturing method of the present invention can be processed into various forms according to a known process for molding an oxymethylene copolymer. Examples of the form of the molded article made from the oxymethylene copolymer of the present invention include, but not limited to, pellets, a rod, a thick plate, a sheet, a tube and a cylindrical or rectangular container.

The oxymethylene copolymer of the present invention and the molded article thereof can be used as various parts such as machine parts, electrical parts, automobile parts, building materials and else, which are conventionally known to be the usage of oxymethylene copolymers. In particular, since the amount of formaldehyde generated from the molded article of the present invention can be suppressed even in a high-temperature and high-humidity environment, it can favorably be used as vehicle components and building materials that are used in a high-temperature and high-humidity environment.

EXAMPLES

Hereinafter, embodiments and effect of the present invention will be described specifically by way of examples and comparative examples, although the present invention should not be limited in any way to these example.

<Raw Materials>

Raw materials (catalyst, deactivator, antioxidant and thermal stabilizer) used in the examples and the comparative examples were as follows. Here, the notations correspond to those indicated in Tables 1-4.

(1) Catalyst
B-1: Perchloric acid (from Aldrich)
B-2: Phosphotungstic acid (from Wako)
(2) Deactivator
A-1: N,N-diethyl hydroxylamine (from Arkema, anhydride)
A-2: N,N-bis-octadecyl hydroxylamine (from Aldrich)
A-3: N,N-dibenzyl hydroxylamine (from Aldrich)
A-4: N-isopropyl hydroxylamine (from ANGUS Chemical Company)
A-5: Triethylamine (from Arkema)
A-6: Diethylamine (from Arkema)
A-7: Tinuvin 770 (registered trademark, from BASF)
A-8: Triphenylphosphine (from Hokko)
(3) Antioxidant and thermal stabilizer
C: Irganox 245 (registered trademark, from BASF): antioxidant
D: Melamine (from Mitsui Chemicals): thermal stabilizer <Evaluation Methods>

The physical properties of the oxymethylene copolymers obtained in the examples and comparative examples were determined as follows.

(1) Amount of Formaldehyde Generated

The oxymethylene copolymers obtained in the examples and the comparative examples were cut into 10-30 mg, dried with hot air at 80° C. for 3 hours and placed in 22 mL vials to precisely measure the sample mass. Thereafter, the vial was sealed and subjected to a heat treatment at 160° C. for 2 hours using HS-GC from Shimadzu Corporation (SHIMADZU: Gas Chromatograph (GC-2010), Perkin Elmer: Headspace sample (Turbomatrix 40)). The generated gas was injected into a column, and the integrated peak area of formaldehyde in the gas detected by gas chromatography was determined. A preconstructed calibration curve was used for mass conversion to determine the amount of formaldehyde generated (ppm) per mass of the oxymethylene copolymer. The resulting amount of formaldehyde generated corresponds to the amount of formaldehyde generated from the product.

(2) Amount of Formaldehyde Generated Upon Humidification

The oxymethylene copolymers obtained in the examples and the comparative examples were cut into 10-30 mg and subjected to humidification under the conditions of 80° C. and relative humidity of 98% (98% RH) for 24 hours. The subsequent procedure was the same as the procedure described in (1) above to determine the amount of formaldehyde generated (ppm) per mass of the oxymethylene copolymer. The amount of formaldehyde generated upon humidification was assumed to be the amount of formaldehyde generated from the product that was stored in a high-temperature and high-humidity environment for a long period of time.

(3) MI Value

MI value (melt index) was determined according to ISO1133 (190° C., under a load of 2.16 kg). This MI value has a correlation with the molecular weight, where a greater MI value indicates a smaller molecular weight. Therefore, if a MI value is greater where the only difference is the deactivator, the polymer main chain is presumably degraded by the acid catalyst that was not deactivated.

Example 1

<<Step 1>>

1000 g of trioxane (from Mitsubishi Gas Chemical Company, purity: 99.96%), 40 g of 1,3-dioxolane (from Toho Chemical Industry, purity: 99.99%) as a comonomer and 0.44 g of methylal (from Kuraray) as a molecular weight modifier were injected into a stirrer-equipped 5 L polymerization reactor maintained at 60° C. in a nitrogen atmosphere. Subsequently, perchloric acid (B-1) as a polymerization catalyst (acid catalyst) was added in an amount of $5.75 \times 10^{-7}$ mol per 1 mole of trioxane used to allow reaction for 15 minutes.

<<Step 2>>

Fifteen minutes after the addition of the polymerization catalyst in the step 1, N,N-diethyl hydroxylamine (A-1) as a deactivator was added in an amount of 600 molar times the amount of the polymerization catalyst used. The deactivator was diluted in benzene to a concentration of 0.1 mol/L prior to the addition. Five minutes after the addition of the deactivator, the reactor was stopped to obtain a crude oxymethylene copolymer.

<<Step 3>>

To 45 g of the crude oxymethylene copolymer obtained in the step 2, 0.135 g of Irganox 245 as an antioxidant and 0.045 g of melamine as a thermal stabilizer were added and melt-kneaded at 222° C. for 20 minutes to obtain an oxymethylene copolymer. The oxymethylene copolymer obtained in the example was evaluated according to the above-described methods. The results thereof are shown in Table 1.

Example 2

An oxymethylene copolymer was obtained in the same manner as Example 1 except that the catalyst was added in an amount of $3.90 \times 10^{-7}$ mol per 1 mole of trioxane. The oxymethylene copolymer obtained in the example was evaluated according to the above-described methods. The results thereof are shown in Table 1.

TABLE 1

| | \multicolumn{2}{c}{Catalyst} | \multicolumn{3}{c}{Deactivator} | | \multicolumn{2}{c}{Formaldehyde odor} |
|---|---|---|---|---|---|---|---|---|
| | Type of catalyst | Amount of catalyst mol/mol-TOX | Type of deactivator | Amount of deactivator ppm | Molar times/mol-Cat. | MI g/10 min. | Normal ppm | Humidification ppm |
| Example 1 | B-1 | $5.75 \times 10^{-7}$ | A-1 | 342 | 600 | 7.2 | 118.9 | 145.0 |
| Example 2 | B-1 | $3.90 \times 10^{-7}$ | A-1 | 232 | 600 | 7.2 | 105.5 | 140.0 |

Examples 3-5, Comparative Examples 1-5

Oxymethylene copolymers were obtained in the same manner as Example 1 except that N,N-bis-octadecyl hydroxylamine (A-2, Example 3), N,N-dibenzyl hydroxylamine (A-3, Example 4), N-isopropyl hydroxylamine (A-4, Example 5), triethylamine (A-5, Comparative example 1), diethylamine (A-6, Comparative example 2), Tinuvin 770 (A-7, Comparative example 3) and triphenylphosphine (A-8, Comparative example 4) were used, respectively, instead of N,N-diethyl hydroxylamine (A-1) as a deactivator. In addition, an oxymethylene copolymer was obtained in the same manner as Example 1 except that no deactivator was used (Comparative example 5). The oxymethylene copolymers obtained in the examples and the comparative examples were evaluated according to the above-described methods. The results thereof are shown in Table 2.

TABLE 2

| | Catalyst | | Deactivator | | | | Formaldehyde odor | |
|---|---|---|---|---|---|---|---|---|
| | Type of catalyst | Amount of catalyst mol/mol-TOX | Type of deactivator | Amount of deactivator ppm | Molar times/mol-Cat. | MI g/10 min. | Normal ppm | Humidification ppm |
| Example 1 | B-1 | $5.75 \times 10^{-7}$ | A-1 | 342 | 600 | 7.2 | 118.9 | 145.0 |
| Example 3 | B-1 | $5.75 \times 10^{-7}$ | A-2 | 1399 | 600 | 8.1 | 123.4 | 166.9 |
| Example 4 | B-1 | $5.75 \times 10^{-7}$ | A-3 | 554 | 600 | 8.3 | 125.0 | 168.4 |
| Example 5 | B-1 | $5.75 \times 10^{-7}$ | A-4 | 196 | 600 | 8.4 | 121.0 | 165.0 |
| Comparative example 1 | B-1 | $5.75 \times 10^{-7}$ | A-5 | 388 | 600 | 10.8 | 140.5 | 172.0 |
| Comparative example 2 | B-1 | $5.75 \times 10^{-7}$ | A-6 | 281 | 600 | 10.1 | 145.7 | 176.0 |
| Comparative example 3 | B-1 | $5.75 \times 10^{-7}$ | A-7 | 1842 | 600 | 11.8 | 248.8 | 260.0 |
| Comparative example 4 | B-1 | $5.75 \times 10^{-7}$ | A-8 | 1005 | 600 | 15.6 | 241.1 | 248.9 |
| Comparative example 5 | B-1 | $5.75 \times 10^{-7}$ | — | 0 | 0 | 23.5 | 178.0 | 310.0 |

Examples 6-9, Comparative Example 6

Oxymethylene copolymers were obtained in the same manner as Example 1 except that N,N-diethyl hydroxylamine (A-1) as a deactivator were added in an amount of 90 molar times (Example 6), 200 molar times (Example 7), 830 molar times (Example 8), 3750 molar times (Example 9) and 30 molar times (Comparative example 6) the amount of the polymerization catalyst used, respectively, instead of 600 molar times the amount of the polymerization catalyst used. In Examples 6 and 9 and Comparative example 6, the catalyst was added in an amount of $3.90 \times 10^{-7}$ mol per 1 mole of trioxane used. The oxymethylene copolymers obtained in the examples and the comparative examples were evaluated according to the above-described methods. The results thereof are shown in Table 3.

TABLE 3

Amounts of terminator

| | Catalyst | | Deactivator | | | | Formaldehyde odor | |
|---|---|---|---|---|---|---|---|---|
| | | Amount of | | | | | | |
| | Type of | catalyst | Type of | Amount of deactivator | | MI | Normal | Humidification |
| | catalyst | mol/mol-TOX | deactivator | ppm | Molar times/mol-Cat. | g/10 min. | ppm | ppm |
| Example 1 | B-1 | $5.75 \times 10^{-7}$ | A-1 | 342 | 600 | 7.2 | 118.9 | 145.0 |
| Example 6 | B-1 | $3.90 \times 10^{-7}$ | A-1 | 35 | 90 | 6.3 | 101.9 | 138.6 |
| Example 7 | B-1 | $5.75 \times 10^{-7}$ | A-1 | 114 | 200 | 6.2 | 113.9 | 148.5 |
| Example 8 | B-1 | $5.75 \times 10^{-7}$ | A-1 | 473 | 830 | 7.3 | 109.4 | 143.7 |
| Example 9 | B-1 | $3.90 \times 10^{-7}$ | A-1 | 1448 | 3750 | 7.2 | 98.4 | 143.4 |
| Comparative example 6 | B-1 | $3.90 \times 10^{-7}$ | A-1 | 12 | 30 | 10.0 | 124.1 | 200.8 |

Example 10, Comparative Example 7

An oxymethylene copolymer was obtained in the same manner as Example 1 except that phosphotungstic acid (B-2) was added instead of perchloric acid (B-1) as a polymerization catalyst in an amount of $4.10 \times 10^{-7}$ mol per 1 mole of trioxane used (Example 10). An oxymethylene copolymer was obtained in the same manner as Example 10 except that triphenylphosphine (A-8) was used as a deactivator (Comparative example 7). The oxymethylene copolymers obtained in the examples and the comparative examples were evaluated according to the above-described methods. The results thereof are shown in Table 4.

TABLE 4

Types of catalyst

| | Catalyst | | Deactivator | | | | Formaldehyde odor | |
|---|---|---|---|---|---|---|---|---|
| | | Amount of | | | | | | |
| | Type of | catalyst | Type of | Amount of deactivator | | MI | Normal | Humidification |
| | catalyst | mol/mol-TOX | deactivator | ppm | Molar times/mol-Cat. | g/10 min. | ppm | ppm |
| Example 1 | B-1 | $5.75 \times 10^{-7}$ | A-1 | 342 | 600 | 7.2 | 118.9 | 145.0 |
| Example 10 | B-2 | $4.10 \times 10^{-7}$ | A-1 | 242 | 600 | 6.6 | 120.0 | 154.1 |
| Comparative example 7 | B-2 | $4.10 \times 10^{-7}$ | A-8 | 711 | 600 | 8.7 | 239.2 | 384.0 |

As can be appreciated from Tables 1-4, the amount of formaldehyde generated from the product can be reduced by adding and melt-kneading the above-described hydroxylamine compound represented by General formula (1) with a product resulting from reaction between trioxane and a comonomer. Furthermore, an oxymethylene copolymer can be obtained with which the amount of formaldehyde generated from the product when stored in a high-temperature and high-humidity environment for a long period of time is reduced by making the amount of the polymerization catalyst to lie in a specific range.

The invention claimed is:

1. A method for manufacturing an oxymethylene copolymer, comprising:
   polymerizing a polymerization raw material containing trioxane and a comonomer in the presence of $1.0 \times 10^{-8}$ moles or more and $1.0 \times 10^{-6}$ moles or less of an acid catalyst per 1 mole of trioxane;
   deactivating the acid catalyst by adding and mixing a hydroxylamine compound represented by General formula (1) below:

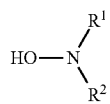

(1)

where $R^1$ and $R^2$ each independently represent a hydrogen atom or a C1-C20 organic group, with the product obtained during the polymerizing of the polymerization raw material, wherein the hydroxylamine compound is in an amount of 50-5000 molar times the amount of the acid catalyst; and
further melt-kneading the mixture of the product and the hydroxylamine compound obtained during the adding and mixing of the hydroxylamine compound,
wherein the hydroxylamine compound is at least one selected from the group consisting of N,N-diethyl hydroxylamine; N,N-dibenzyl hydroxylamine; and N-isopropyl hydroxylamine.

2. The method according to claim 1, wherein the hydroxylamine compound is N,N-diethyl hydroxylamine.

3. The method according to claim 1, wherein the hydroxylamine compound is added in an amount of 50-2000 molar times the amount of the acid catalyst.

4. The method according to claim 1, wherein the acid catalyst is at least one or more selected from the group consisting of a perchloric acid-based catalyst, a trifluoromethanesulfonic acid-based catalyst and a heteropoly acid-based catalyst.

5. The method according to claim 1, wherein the acid catalyst is perchloric acid or a derivative thereof.

6. The method according to claim 1, wherein the comonomer is at least one selected from the group consisting of ethylene oxide, propylene oxide, butylene oxide, styrene oxide, methyl glycidyl ether, ethyl glycidyl ether, butyl glycidyl ether, phenyl glycidyl ether, 1,3-dioxolane, propylene glycol formal, diethylene glycol formal, triethylene glycol formal, 1,4-butanediol formal, 1,5-pentanediol formal and 1,6-hexanediol formal.

7. The method according to claim 1, wherein the oxymethylene copolymer comprises an oxymethylene group and an oxyalkylene group having two or more carbons, and the content of the oxyalkylene group having two or more carbons contained in the oxymethylene copolymer is 0.4 moles or more and 15 moles or less with respect to a total of 100 moles of the oxymethylene group and the oxyalkylene group.

* * * * *